Figure 1:
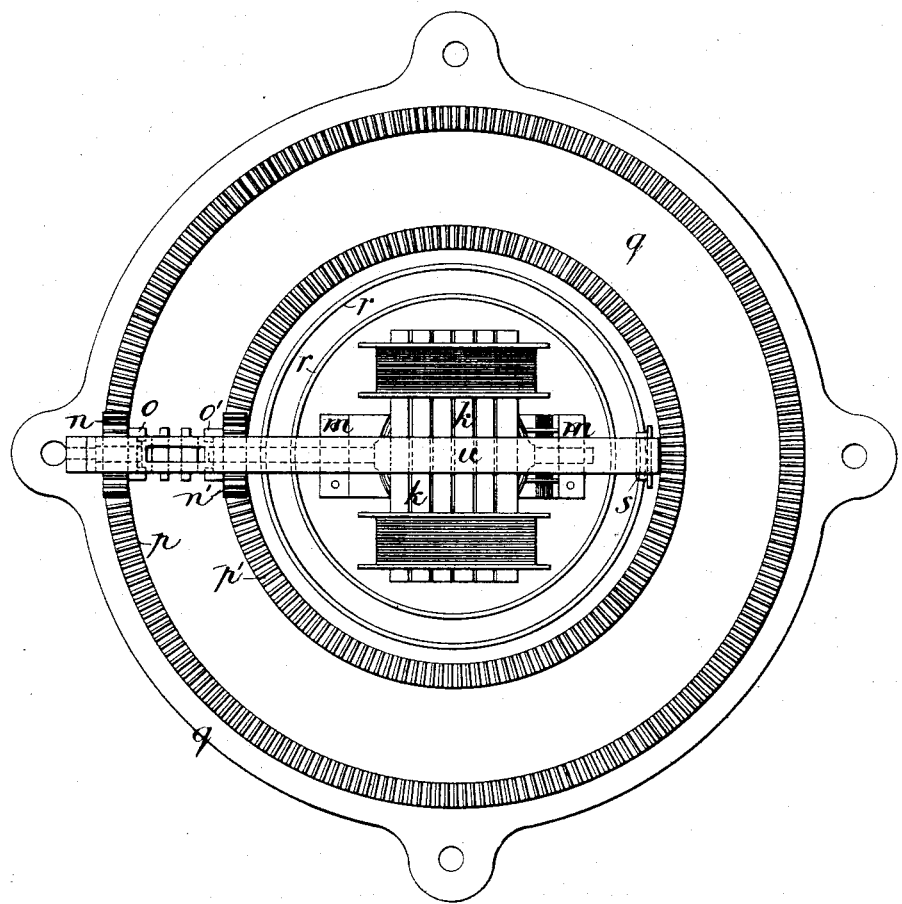

(No Model.)  2 Sheets—Sheet 1.

C. P. ELIESON.
APPARATUS FOR TRANSMITTING POWER FROM ELECTRIC MOTORS.

No. 344,260.  Patented June 22, 1886.

Witnesses:  Inventor:

(No Model.) 2 Sheets—Sheet 2.

C. P. ELIESON.

APPARATUS FOR TRANSMITTING POWER FROM ELECTRIC MOTORS.

No. 344,260. Patented June 22, 1886.

Witnesses:
Geo H. Hamilton
G. S. Heyson

Inventor:
C. P. Elieson

UNITED STATES PATENT OFFICE.

CHAIMSONOVITZ P. ELIESON, OF LONDON, ENGLAND, ASSIGNOR TO THE ELECTRIC LOCOMOTIVE AND POWER COMPANY, (LIMITED,) OF SAME PLACE.

APPARATUS FOR TRANSMITTING POWER FROM ELECTRIC MOTORS.

SPECIFICATION forming part of Letters Patent No. 344,260, dated June 22, 1886.

Application filed October 31, 1885. Serial No. 181,527. (No model.) Patented in England June 6, 1884, No. 8,654; in Germany March 12, 1885, No. 34,178; in France March 20, 1885, No. 167,759; in Belgium August 28, 1885, No. 70,042; in Luxemburg December 1, 1885, No. 614; in Austria-Hungary December 7, 1885, No. 31,625 and No. 63,343, and in Italy December 31, 1885, XIX, 18,999, XXXVII, 381.

*To all whom it may concern:*

Be it known that I, CHAIMSONOVITZ PROSPER ELIESON, a citizen of the Republic of France, residing at London, England, electrician, have invented new and useful Improvements in Transmitting Motive Power from Electromotors, and Apparatus Therefor, of which the following is a specification.

My invention relates to improvements in transmitting motive power from electromotors, and apparatus therefor, the object of the invention being to allow of the employment of an electromotor for driving machinery where the speed required is less than the critical speed of the motor itself—*i. e.*, the speed at which a maximum of work is performed with a minimum expenditure of current, this being effected with very little friction.

In carrying out my invention I employ a bar or bracket of iron or other suitable material, to which is rigidly attached a shaft carrying a fly-wheel. The said shaft works in suitable bearings and serves to communicate motion, by suitable gearing, to the machinery which is to be driven. The electromotor, which may be of any suitable construction, is attached to the said bar or bracket, and the armature-spindle of the electromotor is extended and carries pinions at its extremity, which gear into radial teeth formed on the upper surface of a circular fixed plate similar to a crown-wheel, which forms the base-plate of the apparatus. The said shaft passes through the center of the crown-wheel. The said pinions are loose on the armature-spindle, and are provided with suitable means for fixing the same. The proportion or ratio between the fixed circular plate or crown-wheel and the pinions upon the armature-spindle is determined by the difference between the critical speed of the motor and the speed required to be given to the driving-shaft, as will be well understood by persons accustomed to make or use machinery of the kind in question, more particularly after considering the drawings hereunto annexed, together with the description of them.

The bracket carrying the motor revolves within or upon the circular fixed plate, and thus communicates motion to the shaft carrying the fly-wheel. A circular rail or rails or flange or flanges is or are cast on or otherwise attached to the crown-wheel, and on the said rails or flanges run flanged wheels at the opposite end of the bracket to that of the pinions, and suitably adjusted. The rails or flanges and flanged wheels prevent the pinions from riding over the surface of the crown-wheel, and the flanged wheels serve at the same time to carry the electric current to the motor. The two or more sets of teeth of the crown-wheel are concentric with each other, and the teeth are arranged radially relatively to a common center, and the loose pinions on the armature-spindle (one pinion for each set of teeth) are either one, at option, brought into or out of engagement with a clutch, and whereby the radius or distance from the center of the crown-wheel to that pinion with which the clutch is for the time being brought into engagement shall increase or diminish the speed of the shaft, as desired, without varying the speed of the motor-armature.

In order to enable my invention to be fully understood, I will proceed to describe the same by reference to the accompanying drawings, in which—

Figure 2:
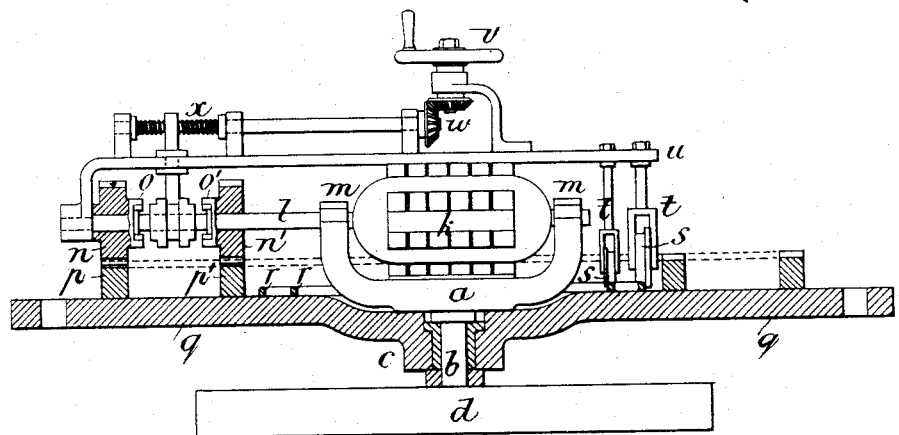
Figure 2:
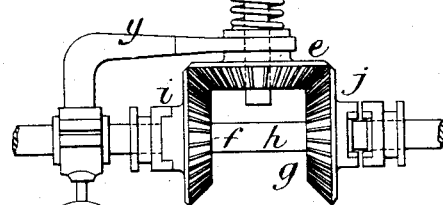
Figure 3:
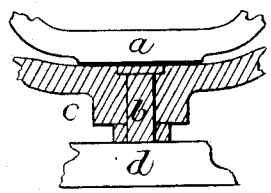
Figure 4:
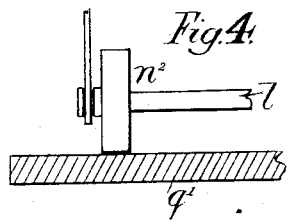

Figure 1 is a plan, and Fig. 2 a sectional elevation, showing an arrangement of my invention suitable for driving a tram-car or the like; and Figs. 3 and 4 are modifications.

Similar letters in all the figures represent similar parts.

$a$ is the bracket, rigidly fixed to the shaft $b$, working in the bearing $c$ in the center of the plate $q$, hereinafter described.

$d$ is a fly-wheel on the shaft $b$, but it will be obvious that such fly-wheel will not always be required. The lower end of the shaft $b$ carries a bevel-wheel, $e$, such bevel-wheel gearing into the bevel-wheels $f$ and $g$, which run loosely on the axle $h$ of the tram-car. Each pinion $f$ and $g$ is provided with a clutch marked $i$ and $j$, respectively.

$k$ is the electromotor, of any suitable construction, the armature-spindle $l$ of which works in the bearings $m$ $m$ of the bracket $a$.

$n$ $n'$ are the loose pinions on the outer end of the spindle $l$; $o$ $o'$, clutches for fixing the said pinions.

$p$ $p'$ are the radial teeth on the upper surface of the fixed plate $q$, which forms the base-plate of the apparatus, and is herein termed the "crown-wheel." The said base-plate carries the bearing $c$ of the shaft $b$, as hereinbefore described.

$r$ $r$ are the rails or flanges on the crown-wheel $q$; $s$ $s$, flanged wheels running on the said rails and carried in supports $t$, connected to the cross-bar $u$, or in any other suitable manner; $v$, hand-wheel for operating by means of the bevel-gear $w$ the screw $x$, working the clutches $o$ and $o'$ of the pinions $n$ $n'$; $y$, weighted fork for keeping the bevel-pinion $e$ in gear with the bevel-pinions $f$ and $g$.

By this arrangement the motor $k$ being started the armature-spindle $l$ will revolve, and if the pinion $n$ be fixed by means of its clutch $o$, operated by the screw $x$ from the hand-wheel $v$, the said pinion $n$ will be caused to rotate with the spindle $l$, and, its teeth being in gear with the radial set of teeth $p$, the pinion will revolve around the crown-wheel $q$, rotating with it the motor $k$, bracket $a$, and shaft $b$, the bevel-pinion $e$ of which will rotate the axle $h$ of the tram-car in one direction or the other, according to whether the pinion $f$ or $g$ is held fixed by its clutch, the revolution of the shaft $b$ being regulated or steadied by the fly-wheel $d$ when a fly-wheel is employed.

When the motor $k$ is driven by the pinion $n$, as hereinbefore described, the greatest amount of power will be obtained with the smallest degree of speed of rotation. As the speed of the tram-car (or other machine) being driven increases, the pinion $n$ can be disengaged from, and the pinion $n'$ be fixed on, the armature-spindle $l$ by the attendant engaging the clutch $o'$. The pinion $n'$ will be thereby caused to rotate the motor $k$ by its teeth being in gear with the radial set of teeth $p'$, when the required degree of speed will be attained. It will thus be seen that I can augment the power from the center or driving shaft, $b$, of the electromotor $k$ by decreasing the speed of revolution of the shaft at the same time that the armature of the motor is maintained at a fixed speed.

This method of transmitting power from electromotors possesses advantages over the methods hitherto in use, as, besides the fact that velocity is by my method changed into power, it allows of employing a fly-wheel for regulating the shaft, and the apparatus is specially suitable for electrical tram-cars, for launches, and, in fact, for any purpose where electrical motive power is required, as it can be governed without impairing the efficiency of the electromotor or wasting the electrical current.

In the drawings I have shown only two sets of radial teeth; but it will be obvious that more than two series of teeth can be employed, each set requiring a separate pinion.

Instead of employing a fixed crown-wheel, $q$, as hereinbefore described, the same can, if desired, be made to revolve, in which case the motor $k$ and the bracket $a$ would be stationary, and the shaft $b$ would be rigidly fixed to the crown-wheel $q$, and motion be thereby communicated to the machinery; but I do not advise this arrangement.

Instead of producing the rotary motion of the driving-shaft $b$ by means of toothed pinions and a crown-wheel, as hereinbefore described, I in some cases—especially where the power exerted is not large—produce the said motion by means of a sliding friction-roller, $n^2$, revolving in contact with a plain surface, $q'$.

Having now particularly described and ascertained the nature of my said invention, and in what manner the same is to be performed, I declare that what I claim is—

1. In combination, an electromotor adapted to rotate, a shaft on which the same is fixed, and which is rotated by such motor, gearing connected with such shaft, whereby the motor and its shaft are caused to revolve about a center, and a central driving-shaft, $b$, actuated by the revolution of the motor-shaft, all as set forth.

2. As a means for varying, as required, the power and speed of the driving-shaft while the speed of the electromotor remains the same, the combination of a plate or crown wheel having two or more concentric circles of radial teeth, corresponding pinions, one for each circle, hung on the armature-spindle of the electromotor, and means for bringing either of such pinions at will into or out of engagement with its respective circle of teeth, all as set forth.

3. In an apparatus for transmitting motive power from an electromotor, the combination, with such motor, of the bracket $a$, armature-spindle $l$, loose pinions $n$ $n'$, clutches $o$ $o'$, fixed plate $q$, having concentric circles of radial teeth, central shaft, $b$, and driving-gear thereon, all substantially as and for the purposes set forth.

4. In an apparatus for transmitting motive power from an electric motor, the combination, with such motor, of the plate $q$, having the concentric rails or flanges $r$ $r$, the armature-spindle $l$, cross-bar $u$, supports $t$ $t$, and flanged wheels $s$ $s$, all substantially as and for the purposes set forth.

C. P. ELIESON.

Witnesses:
 NED H. HAMILTON,
 G. T. REDFERN.